Feb. 22, 1966    S. P. SEDLOCK    3,236,561
VEHICLE STEERING WHEEL COLUMN MOUNTING LEG SUPPORT
Filed April 7, 1964
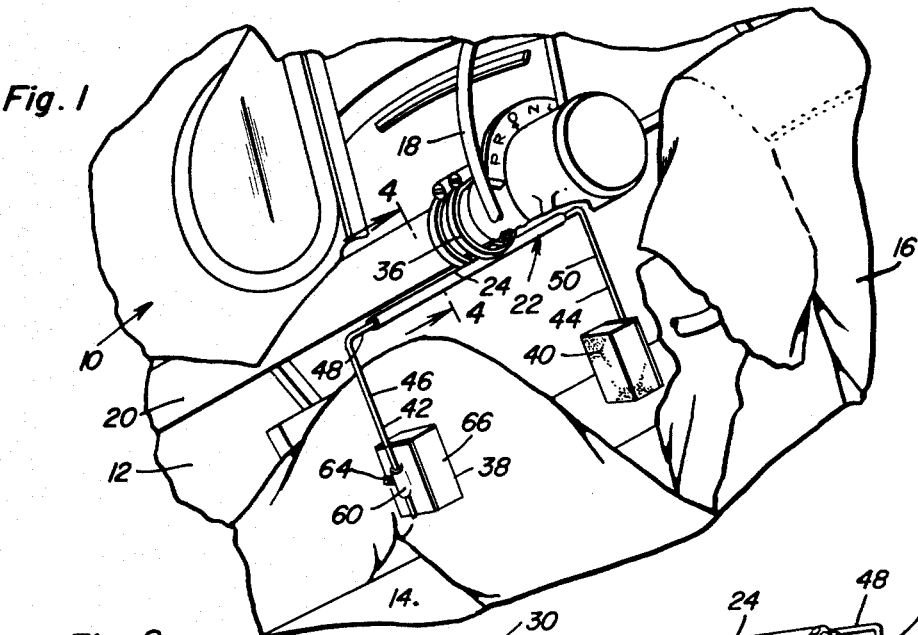
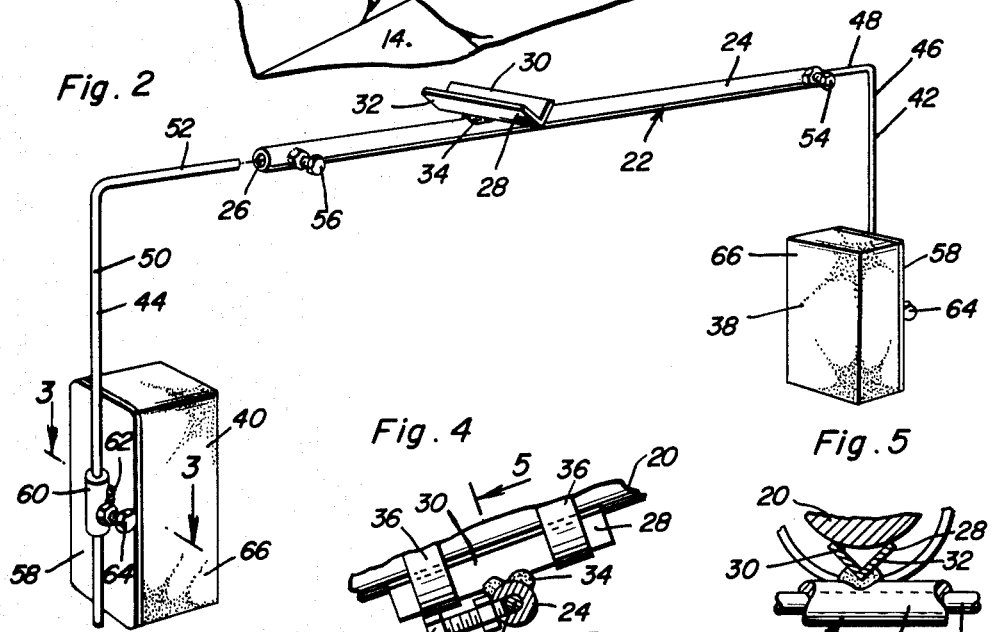
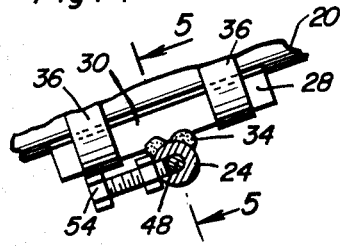
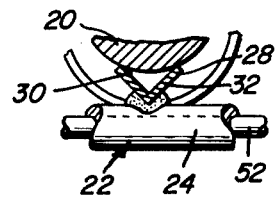
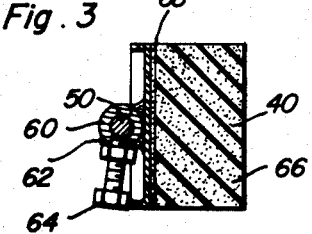
Stephen P. Sedlock
INVENTOR.

United States Patent Office 3,236,561
Patented Feb. 22, 1966

3,236,561
VEHICLE STEERING WHEEL COLUMN MOUNTING LEG SUPPORT
Stephen P. Sedlock, 1212 Philadelphia Ave., Barnesboro, Pa.
Filed Apr. 7, 1964, Ser. No. 357,942
5 Claims. (Cl. 297—427)

This invention relates to a novel and useful leg support and more specifically to a leg support which is adapted to be supported from the steering wheel column of a vehicle.

The leg support of the instant invention includes an elongated arm member having mounting means disposed intermediate its opposite ends adapting said arm member to be mounted on an upright vehicle steering wheel column with the arm member substantially horizontally disposed and extending transversely of the associated vehicle. Knee or leg support or abutment means is disposed on at least one end of the arm member and means is provided for mounting the abutment member on the arm member for swinging movement about an axis generally paralleling the arm member and adjustable shifting longitudinally of the latter. In this manner, the abutment means may be supported from the arm member in a manner so as to be readily positionable in any location within the limits of the leg support in an infinite number of upstanding planes extending longitudinally of the corresponding vehicle.

A main object of this invention is to provide a means whereby the tendency of either one or both legs of the driver of a vehicle to become tired during operation of the vehicle may be minimized.

Another object of this invention is to provide a knee or leg support adapted to provide lateral support to either one or both of the legs of a driver of a vehicle whereby driving of the vehicle will place less strain upon the driver of the vehicle.

Yet another object of this invention is to provide a knee or leg support including a padded portion adapted to be engaged by the knee or leg of the driver of the associated vehicle.

A still further object of this invention is to provide a vehicle steering wheel column mounted leg support in accordance with the preceding objects and constructed in a manner whereby it may be readily adjusted so as to be adaptable to provide lateral support for the legs or knees of any person who may be driving the associated vehicle.

A final object of this invention to be specifically enumerated herein is to provide a knee or leg support in accordance with the preceding objects which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a conventional form of passenger-type of motor vehicle shown with the knee or leg support of the instant invention operatively supported from the steering wheel column of the vehicle;

FIGURE 2 is a perspective view of the knee or leg support shown with one portion thereof detached from the remainder of the support;

FIGURE 3 is an enlarged horizontal sectional view taken substantially upon the plane indicated by the section line 3—3 of FIGURE 2;

FIGURE 4 is an enlarged fragmentary vertical sectional view taken substantially upon the plane indicated by the section line 4—4 of FIGURE 1; and FIGURE 5 is a vertical sectional view taken substantially upon the plane indicated by the section line 5—5 of FIGURE 4.

Referring now more specifically to the drawings the numeral 10 generally designates a conventional form of motor vehicle including a driver's compartment 12 having a seat 14 on which the driver 16 may be seated while operating the vehicle 10.

A steering wheel 18 is supported in the driver's compartment 12 from a steering column 20 and the knee or leg support of the instant invention is generally designated by the reference numeral 22 and is supported from the steering column 20.

With attention now directed more specifically to FIGURE 2 of the drawings it may be seen that the knee or leg support 22 includes an elongated tubular arm member 24 having a longitudinal bore 26 formed therethrough. An angle iron mount 28 including a pair of angulated flanges 30 and 32 is secured to the tubular arm member 24 intermediate its opposite ends in any convenient manner such as by welding 34 with the opposite end portions of the angle iron 28 projecting laterally outwardly from opposite sides of the tubular arm member 24.

As can best be seen from FIGURES 1, 4 and 5 of the drawings the angle iron 28 partially cradles the portion of the steering column 20 adjacent the seat 14 and a pair of adjustable clamp members 36 are encircled about the steering column 20 at points spaced longitudinally therealong and about the opposite end portions of the angle iron 28 to clampingly secure the support 22 on the steering column 20. It may be noted that the clamps 36 may be loosened so as to enable the support 22 to be adjusted longitudinally of the steering column 20 as well as adjustably rotatably positioned on the latter before the clamps 36 are again tightened.

A pair of abutment means 38 and 40 are provided and are supported from the opposite ends of the arm member 24 by means of L-shaped support arms 42 and 44, respectively. The L-shaped support arm 42 includes a pair of angulated legs 46 and 48 while the L-shaped support arm 44 includes a pair of angulated legs 50 and 52. The legs 48 and 52 are rotatably and slidably telescoped into the corresponding opposite ends of the tubular arm member 24 and may be secured in adjusted positions by means of the setscrews 54 and 56, respectively. The setscrews 54 and 56 are, of course, threadedly engaged with the corresponding ends of the arm member 24 and include inner end portions which are engageable with the legs 48 and 52.

Each of the abutment means 38 and 40 includes a mounting plate 58 to which a sleeve member 60 is secured in any convenient manner such as by welding 62. The sleeve members 60 are slidably and rotatably received on the legs 46 and 50 and also include setscrews 64 similar to the setscrews 54 and 56 whereby the mounting plates 58 may be secured in adjusted positions.

Each of the mounting plates 58 has a pad 66 secured thereto in any convenient manner and it will be noted that the pads 66 face each other. The pads 66 may be secured to the mounting plates 58 by means of adhesive 68. The pads 66 may be constructed of any suitable deformable material such as foam rubber or the like and are of a size and shape conforming to the size and shape of the corresponding mounting plates 58.

In operation, the knee or leg support 22 is mounted on the steering column 20 in the manner hereinbefore set forth. Then, after the angle iron 28 has been correctly positioned, the legs 48 and 52 may be adjustably positioned as desired before the setscrews 54 and 56 are tightened. Then, the mounting plate 58 may be adjustably positioned as desired before the setscrews 64 are tightened.

Although the knee or leg support 22 illustrated and described herein includes a pair of abutment means 38 and 40, it is to be noted that the abutment means 38 could be eliminated if desired inasmuch as it is usually the right leg of the driver 16 which will become tired after driving the vehicle 10 for extended periods of time. However, in some instances, the abutment means 38 is desirable and therefore the support 22 has been provided with a pair of opposing abutment means between which the knees of the driver 16 may be received.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A leg support adapted to be secured to and be supported from a vehicle steering wheel column, said leg support comprising an elongated arm member including mounting means intermediate its opposite ends adapting said arm member to be mounted on an upright vehicle steering wheel column with said arm member horizontally disposed and extending transversely of the associated vehicle, abutment means disposed on at least one end of said arm member, mounting means mounting said abutment means on said one end of said arm member for swinging movement about an axis generally paralleling said arm member and shifting longitudinally of said arm member, the last-mentioned mounting means including means frictionally retaining said abutment means in adjusted rotated and longitudinally shifted positions relative to said arm member and also means mounting said abutment means for rotation about an axis generally paralleling the radii of the arc through which said abutment means is swingable.

2. The combination of claim 1 wherein at least said one end of said arm member has a longitudinal bore formed therein opening outwardly of said one end, said mounting means including a generally L-shaped support arm including a pair of angulated legs, one of said legs being telescopingly received in said bore, and mounting means mounting said abutment means on the other leg for adjustable movement longitudinally thereof.

3. The combination of claim 2 wherein the last-mentioned mounting means also includes means mounting said abutment member on said other leg for rotation about an axis generally paralleling said other leg.

4. The combination of claim 1 wherein said abutment means comprises a pad facing toward the other end of said arm member.

5. A leg support adapted to be secured to and be supported from a vehicle steering wheel column, said leg support comprising an elongated arm member including mounting means intermediate its opposite ends adapting said arm member to be mounted on an upright vehicle steering wheel column with said arm member horizontally disposed and extending transversely of the associated vehicle, abutment means disposed at each end of said arm member, mounting means mounting said abutment means on the opposite ends of said arm member for individual swinging movement about axes generally paralleling said arm member and shifting longitudinally of said arm member, the last-mentioned mounting means including means frictionally retaining said abutment means in adjusted rotated and longitudinally shifted positions relative to said arm member, and also means mounting said abutment means for rotation about an axis generally paralleling the radii of the arc through which said abutment means is swingable.

References Cited by the Examiner

UNITED STATES PATENTS

| | | | |
|---|---|---|---|
| 1,307,058 | 6/1919 | McGrath | 297—5 |
| 1,986,555 | 1/1935 | Carlson | 297—427 |
| 2,133,443 | 10/1938 | Girl | 297—427 |
| 2,584,292 | 2/1952 | Rogers | 280—150 |
| 2,696,868 | 12/1954 | Miller | 297—427 |
| 2,872,966 | 2/1959 | Chamness | 297—423 |
| 3,018,134 | 1/1962 | Shiplett et al. | 297—427 |

FRANK B. SHERRY, *Primary Examiner.*